United States Patent
Schmidt

(10) Patent No.: US 7,011,777 B2
(45) Date of Patent: Mar. 14, 2006

(54) ASSEMBLY FOR HOLDING PLASTIC FILM WITHIN A MOLD

(75) Inventor: Horst Schmidt, Tilbury (CA)

(73) Assignee: Build a Mold Limited, Windsor (CA)

( * ) Notice: Subject to any disclaimer, the term of this patent is extended or adjusted under 35 U.S.C. 154(b) by 333 days.

(21) Appl. No.: 10/117,367

(22) Filed: Apr. 5, 2002

(65) Prior Publication Data

US 2002/0190411 A1 Dec. 19, 2002

Related U.S. Application Data

(60) Provisional application No. 60/281,813, filed on Apr. 5, 2001.

(51) Int. Cl.
*B29C 45/14* (2006.01)
*B29C 45/80* (2006.01)

(52) U.S. Cl. .................. 264/40.1; 264/266; 264/267; 264/275

(58) Field of Classification Search ............. 264/40.1, 264/40.5, 257, 259, 265, 266, 267, 268, 271.1, 264/275, 279, 316; 425/127, 129.1
See application file for complete search history.

(56) References Cited

U.S. PATENT DOCUMENTS

| 5,154,872 | A | * | 10/1992 | Masui et al. | ........... 264/266 |
|---|---|---|---|---|---|
| 5,223,201 | A | * | 6/1993 | Masui et al. | ........... 264/163 |
| 5,238,640 | A | * | 8/1993 | Masui et al. | ........... 264/266 |
| 5,589,121 | A | * | 12/1996 | Inagaki et al. | ........... 264/132 |
| 5,785,910 | A | * | 7/1998 | Sakashita et al. | ........ 264/45.5 |
| 6,203,744 | B1 | * | 3/2001 | Hara et al. | ........... 264/266 |
| 6,413,461 | B1 | * | 7/2002 | Kobayashi et al. | ........ 264/257 |
| 6,524,510 | B1 | * | 2/2003 | Spengler | ........... 264/248 |
| 6,579,488 | B1 | * | 6/2003 | Kobayashi et al. | ........ 264/266 |

FOREIGN PATENT DOCUMENTS

JP 62-181114 * 8/1997

OTHER PUBLICATIONS

English translation of Jap. Ref. 62181114, published Aug. 8, 1987.*

* cited by examiner

*Primary Examiner*—Angela Ortiz
(74) *Attorney, Agent, or Firm*—Carlson, Gaskey & Olds

(57) ABSTRACT

A mold tool includes upper and lower sections defining a cavity within which a plastic film preform is placed before injection of plastic forming a molded article. The plastic film extends between an interface defined between the sections of the mold. The interface secures a position of the plastic film within the mold tool preventing movement during injection of plastic. The interface is specifically configured to secure the plastic film without damage. The specific configuration of the interface is determined according to a relationship between molding process parameters and physical characteristics of the plastic film.

6 Claims, 1 Drawing Sheet

ASSEMBLY FOR HOLDING PLASTIC FILM WITHIN A MOLD

This application claims priority to provisional application Ser. No. 60/281,813 filed on Apr. 5, 2001.

BACKGROUND OF THE INVENTION

The invention relates to an assembly and method of holding plastic film within a mold.

In-mold decorating is a term of art describing the process of applying a decorative coating to a plastic part during the molding process. Conventional methods of applying a decorative coating include the use of a paint film placed within the mold that adheres to a plastic substrate injected into the mold during the molding process. A currently known alternative to the use of paint film is the use of a plastic film. The use of plastic film provides several advantages over the use of paint film. The plastic film can stretch to a greater extent than plastic film, allowing application to complex and intricate shapes. Further, plastic film provides the same color matching capabilities as do paint films. Finally, plastic film is formed of substantially the same base material as the substrate so removal of the plastic film is not required prior to recycling, as is required for paint based films.

Although plastic film includes many advantages over the use of paint films, the use of plastic film presents several design and processing challenges. Typically, plastic film includes at least three layers, a clear layer, a color layer and a substrate layer. The plastic film may include additional layers depending on the composition of the molded article to which the plastic film is adhered. The plastic film must be secured within the mold with sufficient force to prevent movement during molding at pressure, while not crushing the plastic film and the color layer. Crushing of the color layer may cause discoloration and tearing of the plastic film.

Accordingly, it is desirable to develop an apparatus and method of holding the plastic film within the mold with sufficient force to secure the plastic film in place against high molding pressure without causing damage to the plastic film.

SUMMARY OF THE INVENTION

An embodiment of this invention is a mold tool including first and second sections defining an interface for holding a plastic film during injection without damaging the plastic film.

The mold tool assembly includes upper and lower sections cooperating to define a mold cavity. A surface on each of the upper and lower sections about the perimeter of the cavity defines an interface when clamped together to secure the plastic film within the mold. The plastic film is preformed into a desired shape and inserted into the mold. A portion of the plastic film is trapped between the upper and lower sections of the mold within an interface. The interface is configured to apply sufficient clamping force to the plastic film to prevent the high pressure of plastic injected into the mold from blowing out the plastic film, without damaging the plastic film.

The interface is defined by upper and lower surfaces on the upper and lower mold sections. The plastic film is held within a gap between the upper and lower surfaces. Each of the surfaces also defines a width. The gap and width of the interface determine the amount of clamping force exerted on the plastic film when the mold sections are closed. The clamping force prevents plastic injected at high pressure into the cavity from shifting the plastic film during molding. The level of clamping force is balanced to prevent excessive application of force that can damage or crush the plastic film.

The balance of clamping force securing the plastic film within the mold includes properly dimensioning the gap and width relative to physical properties of the plastic film. The gap and width extend about the perimeter of the cavity and form the interface. The width and gap thickness are specifically adapted according to physical properties of the specific plastic film material used in each application. Physical properties of the plastic film material include compressive strength, flexure strength, compressive modulus, and elongation of the plastic film material. Each specific composition of plastic film includes unique physical properties used to determine the proper dimensions for the interface.

Further, specific molding process variables are considered for the determination of the specific dimension of the interface. A maximum clamping force is used along with other characteristics to determine the dimension of the interface. In addition, the specific molded part configuration along with the pressure of plastic injected into the mold dictates a clamping force required for a particular part that is also related to the physical properties of the plastic film to determine the specific dimensions of the interface.

The configuration of the mold tool of this invention provides proper application of clamping force on the plastic film to secure the plastic film, while not causing damage to the plastic film.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
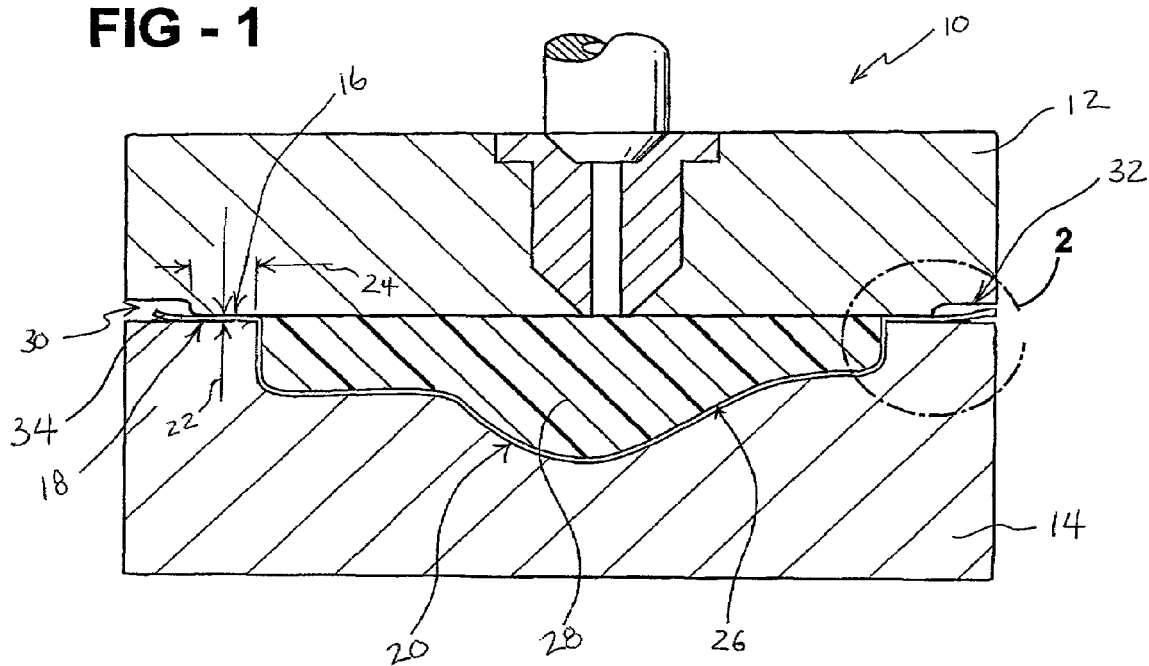
FIG. 1 is cross sectional view of a mold assembly according to this invention.
Figure 2:
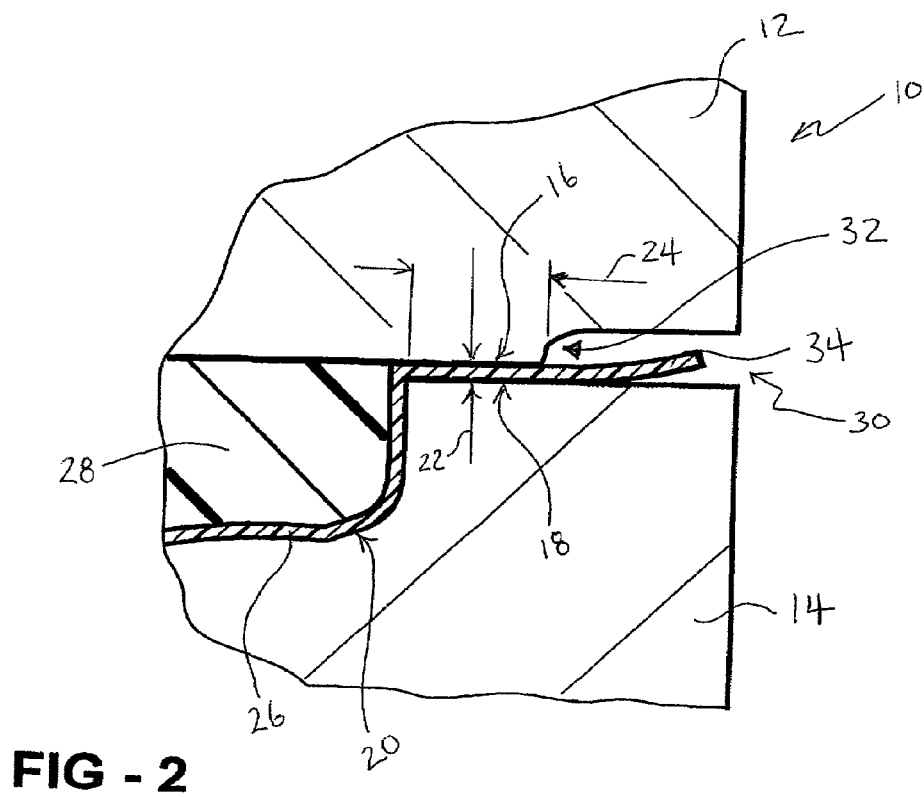
FIG. 2 is an enlarged cross-sectional view of an interface between an upper section and a lower section of a mold for holding a plastic film according to this invention.

Referring to FIGS. 1, 2 a mold tool 10 is shown and includes upper and lower sections 12, 14. The upper and lower sections 12,14 of the mold 10 cooperate to form a cavity 20. Surfaces 16, 18 disposed about a perimeter 32 of the cavity 20 form an interface 30 to secure the plastic film 26 within the mold 10. Preferably, the plastic film 26 is preformed into a desired shape and inserted into the mold 10. A portion 34 of the plastic film 26 is trapped between the upper and lower sections 12,14 of the mold 10 at the interface 30.

Referring to FIG. 2, the interface 30 is defined by the upper surface 16 on the upper mold portion 12 and the lower surface 18 disposed on the lower mold portion 14. The plastic film 26 is held within a gap 22 between the upper and lower surfaces 16, 18. Each of the surfaces 16, 18 also defines a width 24. The gap 22 and width 24 of the interface 30 determine the amount of clamping force exerted on the plastic film 26 when the mold sections 12, 14 are closed. The clamping force prevents plastic injected at high pressure into the cavity 20 from shifting the plastic film 26 during molding of a molded article 28. The level of clamping force is balanced, preventing excessive application of force that can damage or crush the plastic film 26.

The balance of clamping force securing the plastic film 27 within the mold 10 includes the steps of properly dimensioning the gap 22 and width 24 relative to physical properties of the plastic film 26. The gap 22 and width 24 extend about the perimeter 32 of the cavity 20 and form the interface 30, that provides the clamping force secming the plastic film 26. The width 24 combined with the length of the perimeter 32 is determined to provide an area over which to apply the required clamping force. The gap 22 is sized in relation to the thickness of the plastic film 26. The width 24 and gap 22 are specifically adapted according to physical properties of the specific plastic film material used in each application. A worker skilled in the art will recognize the physical properties of the plastic film and understand that such information is of common knowledge. Further, the specific units of each characteristic are not limited to those disclosed within this application.

Physical properties of the plastic film 26 include compressive strength, flexure strength, compressive modulus, and elongation of the plastic film 26. Each specific composition of plastic film 26 includes unique physical properties used to determine the proper dimensions for the interface 30.

Further, specific molding process variables are considered for the determination of the specific dimension of the interface 30. The molding process includes specific parameters common to all molding configurations. The mold 10 is supported within a molding machine (not shown) that exerts specific amounts of clamping force. A maximum clamping force of the machine is used along with other characteristics to determine the dimension of the interface 30. In addition, the specific molded part configuration along with a pressure of plastic injected into the mold 10 dictates a clamping force required for a particular part that is also related to the physical properties of the plastic film 26 to determine the specific dimensions of the interface 30.

The specific relationship between characteristics of the plastic film 26 along with molding process parameters determine the specific width 24 and gap 22 of the interface 30 portion of the mold 10. Minimum gap thickness is determined by a relationship between the minimum material thickness and the elongation properties of the plastic material. Preferably, the minimum gap thickness is determined by the following relationship:

$$\text{Minimum gap thickness} = \frac{m2}{\left(\frac{E}{3}\right)} \quad \text{Equation 1}$$

wherein:
m2=maximum thickness of the plastic film in inches; and
E=Elongation as a percentage of plastic film thickness.

Further, the maximum gap thickness is determined by a relationship between the film thickness, the compressive strength of the film material and the maximum injection pressure utilized in the process. This relationship is preferably expressed in the flowing equation:

$$\text{Maximum gap thickness} = \frac{m1}{\left[2\left(\frac{i}{L}\right)\right]} \quad \text{Equation 2}$$

wherein:
m1=minimum thickness of plastic film in inches;
i=compressive strength of the plastic film (rupture or yield) (psi)
L=injection pressure of plastic into cavity of mold (psi)

The width 24 of the interface 30 is determined by a relationship between the clamping force of the press, the clamping force used in the process, the total length of the perimeter 32, injection pressure of plastic into the mold cavity 20, flexure strength of the film material, elongation properties of the plastic film, a compressive modulus of the film 26, along with minimum and maximum thickness of the plastic materials. Preferably, the optimum, minimum and maximum width 24 of the interface 30 is determined by the below listed equations.

$$\text{Optimum width} = \left[\frac{(H*j)}{(f3)}\right] * \left(\frac{E}{100}\right) \quad \text{Equation 3}$$

$$\text{Maximum width} = \left(\frac{H*i}{f1}\right) \quad \text{Equation 4}$$

$$\text{Minimum width} = \sqrt{\frac{L*(\text{maximum gap})*H}{n}} \quad \text{Equation 5}$$

where
f1=available clamping force of molding machine (lbs)
f2=clamping force required for the part (lbs)
f3=clamping force used in process (lbs)
H=total length of mold perimeter (inches)
i=compressive strength of film material (rupture or yield) (psi)
j=flexure strength (rupture or yield) (psi)
L=maximum injection pressure require to mold part (psi)
m1=minimum film thickness (inches)
m2=maximum film thickness (inches)
n=compressive modulus of film material (psi)
E=elongation as a percentage of thickness.

The resulting interface 30, facilitates a desired amount of clamp force applied to the plastic film 26. The specific gap 22 and width 24 of the interface 30 provides proper clamping force to the plastic film 26.

The invention also includes a method of securing the plastic film 26 within a mold 10. The method includes the steps of placing the preformed plastic film 26 into the mold cavity 20 and placing a portion of the plastic film 26 within the interface 30 between the mold sections 12, 14. The interface 30 includes the gap 22 sized according a relationship between physical properties of the plastic film 26 and process parameters of the molding operation. The relationship used to determine the specific configuration of the gap 22 and width 24 provides proper clamping force application to the plastic film 26 within the mold cavity 20.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of securing a plastic film material within a mold comprising the steps of:
   a. placing a preform comprising the plastic film material within a cavity defined by first and second mold sections;
   b. placing a portion of said preform within an interface between said first and second mold sections;
   c. sizing a maximun gap of said interface between said first and second mold sections according to a $$\frac{m2}{\left(\frac{E}{3}\right)}$$

wherein m2=maximun plastic film thickness; and
   E=Elongation as a percentage of plastic film thickness;
   d. sizing a minimum gap of said interface between the first and second mold sections according to a relationship:

$$\frac{m1}{\left[2\left(\frac{i}{L}\right)\right]}$$

wherein mi=minimum thickness of the plastic film;
   L=compressive strenght of said plastic film; and
   L=injection pressure of plastic into said cavity; and
   e. sizing a width of said interface between said first and second mold sections according to a second relationship between said physical properties of said plastic film and process parameters.

2. A method of securing a plastic film material within a mold comprising the steps of:
   a. placing a preform comprising the plastic film material within a cavity defined by first and second mold sections;
   b. placing a portion of said preform within an interface between said first and second mold sections;
   c. sizing a gap of said interface between said first and second mold sections according to a first relationship between physical properties of said plastic film and process parameters; and
   d. sizing a width of said interface between said first and second mold sections according to the relationship:

$$\left[\frac{(H*j)}{(f3)}\right]*\left(\frac{E}{100}\right)$$

wherein: f3=clamping force of said mold tool;
   H=length of said perimeter;
   j=flexure strength of said plastic film; and
   E=Elongation as a percentage of plastic film thickness.

3. The method of claim 1, wherein said step d is further defined by determining a maximum of said width according to the relationship:

$$\left(\frac{H*i}{f1}\right)$$

wherein: f1=maximum clamping force of said mold tool;
   H=length of said perimeter; and
   i=compressive strength of said plastic film.

4. The method of claim 1, wherein step d is further defined by determining a minimum of said width according to the relationship:

$$\sqrt{\frac{L*(\text{maximum gap})*H}{n}}$$

wherein: m2=maximum plastic film thickness; and
   E=Elongation as a percentage of plastic film thickness
   H=length of said perimeter;
   n=compressive modulus of said plastic film; and
   L=injection pressure of plastic into said cavity.

5. A method of method of securing a plastic film material within a mold comprising the steps of:
   a. placing a preform comprising the plastic film material within a cavity defined by first and second mold sections;
   b. placing a portion of said preform within an interface between said first and second mold sections;
   c. sizing a gap of said interface between said first and second mold sections according to a first relationship between physical properties of said plastic film and process parameters, and
   d. sizing a width of said interface between said first and second mold sections according to a second relationship between said physical properties of said plastic film and process parameters, wherein one of said physical properties utilized for said step of sizing said gap and sizing said width include an elongation property of said plastic film and one of said process parameters utilized for said step of sizing said gap and sizing said width includes clamping force applied between the first and second mold sections.

6. The method as recited in claim 5, wherein one of said process parameters utilized for said step c. includes injection pressure of a molten material injected into the mold.

* * * * *

UNITED STATES PATENT AND TRADEMARK OFFICE
CERTIFICATE OF CORRECTION

PATENT NO.        : 7,011,777 B2
APPLICATION NO.   : 10/117367
DATED             : March 14, 2006
INVENTOR(S)       : Schmidt, Horst Page 1 of 1

It is certified that error appears in the above-identified patent and that said Letters Patent is hereby corrected as shown below:

Column 5,

Line 30: Please delete "mi" and insert --m1--
Line 31: Delete "L" and insert --i--
Line 35: Please delete "second" after "to a"

Signed and Sealed this

Twenty-second Day of August, 2006

JON W. DUDAS
*Director of the United States Patent and Trademark Office*